May 28, 1940.                S. A. STAEGE                 2,202,406
                       CONDENSATION APPARATUS
                         Filed July 3, 1937

INVENTOR
Stephen A. Staege
BY
Marechel & Noe
ATTORNEY

Patented May 28, 1940

2,202,406

UNITED STATES PATENT OFFICE 2,202,406

CONDENSATION APPARATUS

Stephen A. Staege, Hamilton, Ohio, assignor to The Black-Clawson Company, Hamilton, Ohio, a corporation of Ohio Application July 3, 1937, Serial No. 151,789

14 Claims. (Cl. 137—103)

This invention relates to the withdrawal or disposal of condensate from a vapor system.

One object of the invention is the provision of a condensate removal apparatus of simple construction and operating effectively to provide a controlled regulation to the flow of condensate in order to continuously remove the condensate as fast as it is formed while preventing any large loss of vapor or steam from the line being drained.

Another object of the invention is the provision of a condensate removal apparatus of the character mentioned, the apparatus including a flow measuring device which indicates the rate of flow of condensate through the apparatus.

Another object of the invention is the provision of a condensate removal apparatus in which a mixture of condensate and vapor passes to restricted vaporizing passage of sufficient length and so controlled as to create a substantial back pressure preventing excessive flow of fluid, in vapor form, to the vaporizing passage.

Another object of the invention is the provision of a condensate removal apparatus of the character mentioned in which an elongated restricted vaporizing passage is so arranged that it will not be clogged up by foreign particles.

Another object of the invention resides in the method of control of condensate withdrawal from a vapor pressure system and carried out in the apparatus as above mentioned.

Other objects and advantages of the invention will be apparent from the following description, the appended claims and the accompanying drawing, in which—

Fig. 5 is a view on a small scale showing the condensate removal apparatus connected to a drier roll of a paper making machine or the like.

Figure 1:
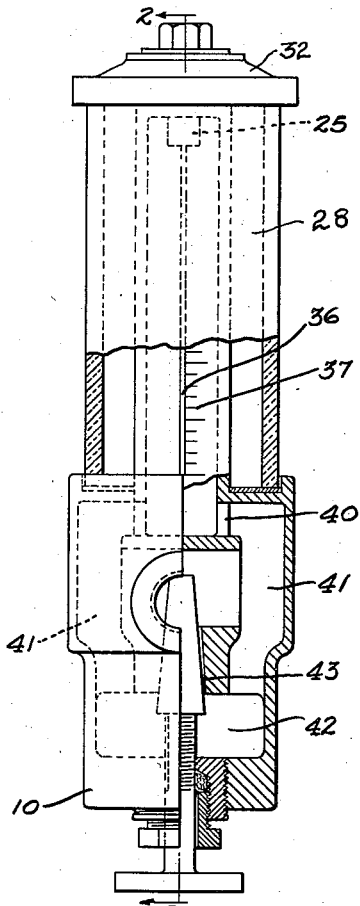
Fig. 1 is a side elevation of a condensate apparatus embodying the present invention, and shown with a portion illustrated in section.
Figure 2:
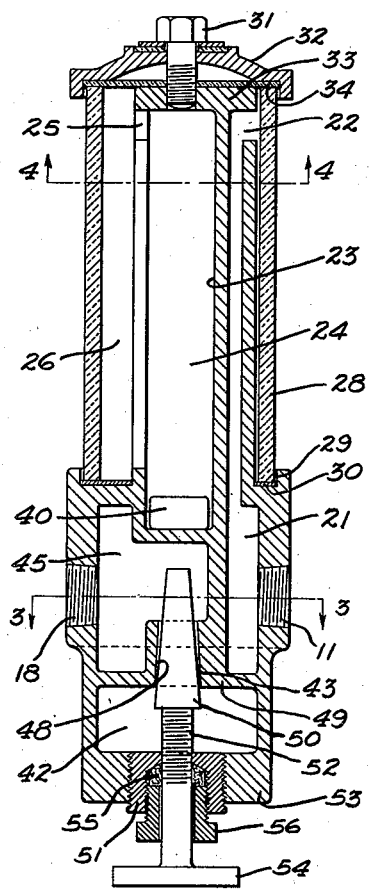
Fig. 2 is a section on the line 2—2 of Fig. 1.
Figure 3:
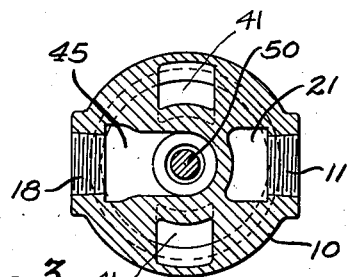
Fig. 3 is a section on the line 3—3 of Fig. 2.
Figure 4:
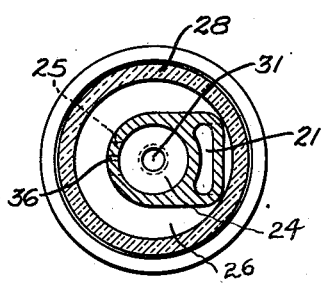
Fig. 4 is a section on the line 4—4 of Fig. 2.
Figure 5:
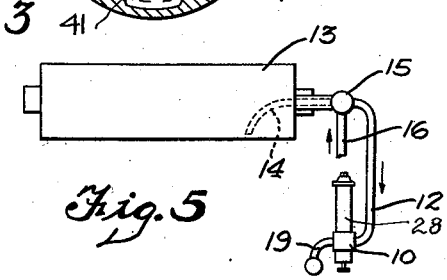

Referring more particularly to the drawing by reference numerals, 10 designates a body member, preferably in the form of a metal casting, and providing a fitting adapted to be connected, as by means of the pipe threads 11, to a pipe 12, see Fig. 5, from which the condensate is to be withdrawn or drained. The condensate removal device may be adapted for use in many ways, and may be used in place of conventional traps, but as herein shown the device is connected to a drier roll 13 of a paper making machine. The drier roll is supplied with steam from pipe 16 the steam flowing into the interior of the roll through a passage extending through one of the roll journals. A suction pipe or condensate pipe 14 extends down to a low point in the interior of the roll from a nonrotatable fitting 15 of any suitable character which may directly support the body member 10, or as herein shown the fitting 15 may be connected to a pipe 12 which leads to the body member 10. The pressure of the steam serves to force the condensate that forms within the roll 13 up through the condensate pipe 14 and then down to the body member 10 of the condensate removal apparatus.

The body member 10 is also provided with pipe threads 18 to which a discharge pipe 19 may be connected. This discharge pipe takes away the condensate and whatever vapor or steam passes through the condensate removal apparatus. The steam and condensate that passes into the pipe 19 may be conducted to an open hot well or other suitable receiver at a relatively lower pressure than that existing in the heating system, or may be utilized in one or more driers at the wet end of a paper machine intended to operate at a lower temperature than roll 13.

The condensate that is supplied through the pipe 12 to the body member 10 passes into an inlet passage 21 which is cored in the body casting 10 and which extends up to an opening 22 considerably higher than the inlet opening into the body member 10. The inlet passage 21 is preferably arranged adjacent a wall 23 of a hollow upstanding portion of the body member which provides a receiving chamber 24. Surrounding the receiving chamber 24 and defining the outer wall of a supply chamber 26 is a transparent tube 28 preferably made of Pyrex glass. The supply chamber 26 receives the condensate from the inlet passage 21 at a point above the normal level of liquid in the supply chamber so that it will not bubble through and violently agitate the pool of condensate retained in the supply chamber, and supplies it, as will be more fully described, to the receiving chamber 24. The lower end of the tube 28 fits within a depression 29 provided in the body member, suitable steam-tight packing material 30 being provided between the glass wall and the body member. The glass wall 28 is secured firmly in place by means of a single attaching bolt 31 which passes through an opening in the metal cover or cap 32 and which is threaded into the top wall 33 of the upstanding portion of the body member, suitable packing 34 being provided for these parts.

On the side of the separating wall which divides the chamber 26 from the chamber 24, and preferably on the opposite side of the part 23 from the inlet passage 21, is a comparatively narrow opening 36 extending downwardly from a larger opening 25 at the top of the wall and preferably reaching down to a point near the bottom of the glass wall 28. The opening 25 is large enough to form a pressure equalizing passage between the two chambers, or the upper part of the opening 36 may serve this purpose. The opening 36 forms a vertical weir so that the rate of flow of condensate passing from the supply chamber 26 to the receiving chamber 24 can be observed through the glass wall 28. The opening 36 is on the opposite side of the upstanding portion 23 from the inlet passage 21 so the condensate must flow around the receiving chamber to give a more even flow to the elongated slot 36. The wall 23 is preferably provided with indicating marks 37 which may be calibrated so as to indicate the rate of flow of liquid in pounds per hour. As the receiving chamber is in free pressure equalizing communication with the supply chamber it will be apparent that changes in the steam pressure existing in the supply chamber may take place without modifying the accuracy of the rate of flow indications.

The condensate that flows through the weir comes generally from the upper portions of the liquid in the chamber 26, and passes to chamber 24 and downwardly through lateral openings 40 and lateral passages 41 into the bottom passage 42, these passages together constituting the receiving chamber of the apparatus, receiving the condensate from the supply chamber through the flow measuring device as previously mentioned. The condensate flows from a point near the bottom of the receiving chamber, but somewhat above the bottom, into the vaporizing passage 43 which is an elongated passage of restricted cross-sectional area so arranged as to create an effective back pressure on the steam by the evaporation of the condensate as it flows through the passage. The gradual pressure gradient existing as the mixture of condensate and vapor passes through the restricted passage, produced by the hot condensate flashing into steam during its movement through the passage, produces a back pressure which prevents excessive flow of fluid from the receiving chamber. The fluid passing through the restricted vaporizing passage moves into the discharge chamber 45 and passes out from that chamber through an unrestricted opening and into the discharge pipe 19, which, as previously mentioned, may extend to a drier roll of comparatively low temperature.

The vaporizing passage 43 may be made of some fixed size sufficient to pass the condensate as fast as it is collected and also pass some small amount of live steam in those cases where the pressure differential across the vaporizing passage is more or less uniform and the amount of condensate coming from the system is not subjected to wide change, but as herein illustrated the passage is formed by a hole 48 which extends upwardly through the wall 49 of the body member 10, this hole having a small taper so that its upper end is somewhat smaller in diameter than its lower end. Within the hole 48 is an adjustable plug 50 which has somewhat greater taper than the taper of the hole 48 so that the thickness of the orifice or passage is smallest at its entrance end in order that foreign particles of solid matter may pass freely through if they are small enough to enter it. Furthermore this difference in taper of the plug and the hole provides a substantially constant cross-sectional area of the vaporizing passage so that the vaporization of the condensate that takes place as the fluid moves along the vaporizing passage is a progressive action.

The plug 50 is rigidly secured to an adjusting stem 52 which is threaded into a removable retaining member 51 that is screwed into the bottom wall 53 of the body member. The stem 52 may be turned by a handle 54 so as to advance or retract the plug and thus vary the cross sectional area of the vaporizing passage. Suitable packing material 55 is held in place by a packing nut 56 to prevent steam leakage at that point.

During normal operation the plug 50 is so adjusted that some continuous vapor discharge takes place into the restricted vaporizing passage in addition to the condensate received by the inner chamber. The level of the liquid in the receiving chamber is therefore maintained substantially at the level of the bottom of the wall 49. The continuous flow of steam from the receiving chamber to and through the vaporizing passage is desirable in order that air that might collect in the bottom of the drier roll 13 will be carried off continuously and not permitted to accumulate, since the presence of air would lower the operating temperature of the roll. This maintains the efficiency and capacity of the drier at a maximum. However, the quantity of flow of steam, as such, from the receiving chamber to and through the vaporizing passage should be small in order to prevent large steam losses and to prevent any considerable loss in steam pressure. The control which the present invention provides for the flow of condensate and steam is such as to operate in an automatic manner, to a large extent, for the condensate passing with the steam into the vaporizing passage flashes into vapor as it moves to a point of lower pressure and thus enormously increases the volume of the fluid passing through the vaporizing passage to prevent excessive flow of live steam from the receiving chamber. When the water is cool, as when starting up, none of it will flash into steam during its movement through the vaporizing passage and a large volume of water can be rapidly removed, but as soon as steam starts to move through the vaporizing passage and the water is substantially the same temperature as the steam, the water will flash into vapor, and enormously increase in volume, during its movement through the vaporizing passage. The velocity of the mixture thus increases very rapidly as it approaches the discharge end of the vaporizing passage and a frictional resistance is produced which prevents excessive loss of steam from the higher pressure system.

As one example of a desired rate of flow as applied to a medium sized drier there might be a continuous discharge of two hundred pounds of water per hour and possibly an additional discharge of about two pounds of steam per hour. Then if the amount of condensate is reduced to perhaps twenty pounds per hour due, for example, to the removal of the paper from the drier, there will be an increase in the amount of steam discharged, which might then amount to about three or four pounds per hour, but since there is some flow of condensate along with the steam into the vaporizing passage the loss of steam would not be excessive.

In adjusting the nozzle opening it is merely necessary for the operator to observe the level of the water in the glass. If the plug is improperly adjusted and is too far in the hole 48 the glass will fill with water since the condensate will not be removed fast enough from the receiving chamber. If the vaporizing passage is sufficiently large, however, so that it passes all the condensate substantially at the same rate that the condensate flows into the receiving chamber then the water level in the glass will be determined by the height necessary to discharge the condensate through the weir orifice. The height of the water in the glass will therefore be an exact indication of the rate of liquid flowing regardless of the pressure of the drier and regardless of the pressure of the return system.

The vaporizing passage extends upwardly from a low point of the receiving chamber so that the scale, sediment and obstructive material of any kind tends to settle at the bottom of the receiving chamber and does not plug up the orifice. Any foreign particles which might enter the orifice will pass through without obstruction in view of the progressive increase in the width of the orifice. From time to time the plug 50 may be temporarily retracted so as to greatly increase the cross-sectional area of the passage to blow material rapidly through the condensate device for cleaning purposes.

While the method and form of apparatus herein described constitute a preferred embodiment of the invention, it is to be understood that the invention is not limited to this precise method and form of apparatus, and that changes may be made therein without departing from the scope of the invention which is defined in the appended claims.

What is claimed is:

1. A condensation device of the character described comprising a supply chamber adapted for connection to a vapor system to be drained, a receiving chamber having pressure equalizing communication at an upper portion thereof with said supply chamber and having a vertically elongated opening through which liquid may flow from the supply chamber, one of said chambers having a transparent wall through which the liquid level therein is visible, an elongated vaporizing passage of restricted cross-section compared to said opening, said passage communicating at one end thereof with said receiving chamber, and a discharge chamber at the other end of said vaporizing passage.

2. A condensation device of the character described comprising a supply chamber adapted for connection to a vapor system to be drained, a receiving chamber having its upper portion enclosed by said supply chamber and in pressure equalizing communication therewith, said chambers having a separating wall providing a weir through which liquid may flow from the supply chamber, said supply chamber having a transparent wall through which the liquid level therein is visible, a vaporizing passage of restricted cross-section compared to said weir, said passage communicating at one end thereof with said receiving chamber, and a discharge chamber at the other end of said vaporizing passage.

3. A condensation device of the character described comprising a body member adapted for connection to a vapor system to be drained and a transparent tube fixed on said body member and forming a supply chamber, a hollow member in said tube forming a receiving chamber and provided with a passage through which liquid may flow from the supply chamber into said hollow member, said hollow member having pressure equalizing communication with said supply chamber, and an elongated vaporizing passage of restricted cross section compared to said firstnamed passage and provided in said body member in series with one of said chambers and producing a back pressure by vaporization of condensate during its passage therethrough.

4. A condensation device of the character described comprising a supply chamber for condensate, an inlet passage adapted for connection to a vapor line to be drained and extending to a point in the supply chamber above the normal liquid level therein, a receiving chamber having pressure equalizing communication at an upper portion thereof with said supply chamber and having a vertically elongated opening through which liquid may flow from the supply chamber, said opening being arranged on one side of the receiving chamber while said inlet passage is at the other side of the receiving chamber, and a vaporizing passage of restricted cross section compared to said opening and communicating at one end with a low point of said receiving chamber to produce a back pressure by vaporization of condensate during its passage therethrough to prevent large vapor losses from said system.

5. A condensation device of the character described comprising a supply chamber for condensate, an inlet passage adapted for connection to a vapor line to be drained and extending to a point on the supply chamber above the normal liquid level therein, a receiving chamber having pressure equalizing communication at an upper portion thereof with said supply chamber and having a vertically elongated opening through which liquid may flow from the supply chamber, said opening being arranged on one side of the receiving chamber while said inlet passage is at the other side of the receiving chamber, said supply chamber having a transparent wall through which the liquid level therein is visible, a vaporizing passage of restricted cross section compared to said opening and communicating at one end thereof with a low point of said receiving chamber, and an outlet passage communicating with the other end of said vaporizing passage.

6. A condensation device of the character described comprising a receiving chamber for receiving condensate from a vapor system to be drained, an elongated vaporizing passage of small cross section compared to its length to control the rate of flow of fluid therethrough and having its inlet end in communication with said receiving chamber, said passage having a frusto-conical form with the base of the cone providing the inlet end, said passage having a substantially constant cross-sectional area throughout its length, and means for adjusting the cross-sectional area of the passage.

7. A condensation device of the character described comprising a receiving chamber, a supply chamber for receiving condensate from a vapor system and having a wall providing a weir between it and the receiving chamber, an elongated vaporizing passage of small cross section compared to said weir and in which hot water may progressively flash into steam and produces a back pressure preventing free flow of the steam from the system, said vaporizing passage having its inlet end in communication with and extending upwardly from a point near the bottom of said receiving chamber, an outlet chamber communicating with the other end of said vaporizing passage, and means for adjusting the cross-sectional area of the vaporizing passage while maintaining its length substantially constant to control the rate of flow of fluid therethrough.

8. A condensation device of the character described comprising a supply chamber and a receiving chamber in pressure equalizing communication with one another at upper portions thereof, said chambers having a separating wall provided with a passage through which liquid may flow from the supply chamber to the receiving chamber, means for observing the liquid level in the supply chamber at any time, and an elongated vaporizing passage of small cross-sectional area compared to said first passage and in which liquid may be flashed into vapor during its passage therethrough, said vaporizing passage communicating at one end with a low point of the receiving chamber, and a discharge chamber communicating with the other end of said vaporizing passage.

9. A condensation device of the character described comprising a supply chamber having a transparent wall, a receiving chamber having its upper portion in free communication with the supply chamber, said chambers having an upright separating wall provided with a vertically elongated opening through which liquid may flow from the supply chamber to the receiving chamber at a rate indicated by the level of the liquid in the supply chamber, and an elongated vaporizing passage of small cross-sectional area compared to said opening and having communication at one end thereof with a low point of the receiving chamber.

10. A condensation device of the character described comprising a supply chamber including a tubular glass wall, a receiving chamber within said supply chamber and in free communication with the upper end of the supply chamber, said receiving chamber having a wall provided with a vertically elongated weir passage through which liquid may flow from the supply chamber, an elongated vaporizing passage of small cross-sectional area compared to said weir and communicating at one end with a low point of the receiving chamber, means for adjusting the cross-sectional area of said vaporizing passage, and a discharge chamber communicating with the other end of said vaporizing passage.

11. A condensation device of the character described comprising a body member having inlet and discharge openings, a glass tube abutting said body member at one end with its interior in free communication with said inlet opening, a cap at the other end of said tube, said body member having an extension in said tube providing a receiving chamber and fixed to said cap, said receiving chamber having pressure equalizing communication at its upper end with the interior of said tube and having a vertically elongated weir opening through which liquid received by said tube may flow into said extension, said body member having an elongated vaporizing passage of restricted cross section compared to said weir and communicating with the said receiving chamber, and a discharge chamber in the body member at the other end of said vaporizing passage and communicating with said discharge opening.

12. A condensate device of the character described comprising a supply chamber for connection to a vapor system to be drained, a receiving chamber, means between said chambers having an opening through which liquid may flow from said supply chamber to said receiving chamber, said supply chamber having a transparent wall through which level of liquid therein may be observed, an elongated vaporizing passage of restricted cross-section compared to said opening and providing a gradual pressure gradient from one end to the other and having its inlet end in communication with a point near the bottom of said receiving chamber, an outlet chamber communicating with the other end of said vaporizing passage, and means for adjusting the cross-sectional area of the vaporizing passage while maintaining its length substantially constant to control the rate of flow of fluid therethrough.

13. A condensate withdrawal device comprising a condensate chamber, an outlet passage, and a single vaporizing passage provided between the condensate chamber and the outlet passage in which water is flashed into steam in a progressive manner during its travel therethrough, said vaporizing passage having concentric spaced inner and outer walls with the spacing distance between said walls restricted as compared to the inside diameter of the vaporizing passage and restricted as compared to the length of the vaporizing passage and with the spacing distance at the condensate end of the passage at least as small as at any other point along the passage, said vaporizing passage throughout its length being devoid of abrupt changes in cross sectional area to provide a gradual continuously decreasing pressure gradient from the condensate chamber to the outlet passage and providing for the discharge of a thin sheet of water and vapor at a rate to discharge all the normal accumulation of condensate in the condensate chamber, and means for axially adjusting one of said walls with respect to the other wall to change the rate of flow of fluid through the vaporizing passage.

14. A condensate withdrawal device comprising a condensate chamber, an outlet passage, and a single vaporizing passage provided between the condensate chamber and the outlet passage in which water is flashed into steam in a progressive manner during its travel therethrough, said passage having concentric spaced inner and outer walls with the spacing distance between said walls restricted as compared to the inside diameter of the vaporizing passage and restricted as compared to the length of the vaporizing passage, said vaporizing passage throughout its length being devoid of abrupt changes in cross sectional area and providing a gradual continuously decreasing pressure gradient from the condensate chamber to the outlet passage and providing for the discharge of a thin sheet of water and vapor at a rate to discharge all the normal accumulation of condensate in the condensate chamber, means for axially adjusting the inner wall with respect to the outer wall to change the rate of flow of fluid through the vaporizing passage, and means for observing the rate of flow of liquid through the device.

STEPHEN A. STAEGE.